United States Patent [19]

Emalfarb et al.

[11] 4,281,473

[45] Aug. 4, 1981

[54] LANDSCAPING BED DIVIDER

[76] Inventors: Mark A. Emalfarb, 760 Kingsbridge Way, Buffalo Grove, Ill. 60090; Sy Emalfarb, 1621 E. Mission Hills Rd., Apt. 302, Northbrook, Ill. 60062; Donald J. Reum, 330 Sixth St., P.O. Box B, Albany, Minn. 56307

[21] Appl. No.: 109,541

[22] Filed: Jan. 4, 1980

[51] Int. Cl.³ .............................................. A01G 1/08
[52] U.S. Cl. ........................................ 47/33; 239/201
[58] Field of Search ...................... 47/32, 33; 239/201, 239/268, 276

[56] References Cited

U.S. PATENT DOCUMENTS

| | | |
|---|---|---|
| 144,055 | 10/1873 | Brown . |
| 760,999 | 5/1904 | Landis . |
| 802,772 | 10/1905 | McCoy . |
| 1,101,909 | 6/1914 | Dolbear . |
| 1,928,447 | 9/1933 | Cornell . |
| 2,081,358 | 5/1937 | Kahn . |
| 2,757,962 | 8/1956 | MacLeod . |
| 2,769,277 | 11/1956 | Keelor ................... 47/33 |
| 2,909,328 | 10/1959 | Babyak ................. 239/268 |
| 3,091,401 | 5/1963 | Hruby .................. 239/276 |
| 3,387,786 | 6/1968 | Rynberk ............... 239/201 |
| 3,485,449 | 12/1969 | Wilson ................. 239/201 |
| 3,545,127 | 12/1970 | Jensen ..................... 47/33 |
| 3,788,001 | 1/1974 | Balfanz .................... 47/33 |

FOREIGN PATENT DOCUMENTS 1422293 11/1965 France ......................................... 47/33

Primary Examiner—Robert E. Bagwill
Attorney, Agent, or Firm—Hosier, Niro & Daleiden, Ltd.

[57] ABSTRACT

A landscaping bed divider is disclosed for forming a boundary between adjacent landscaping areas and for preventing grass or the like from rooting between adjacent areas. The divider is formed as an elongated structure having an enlarged upper section, and a flange section extending lengthwise along the upper section and depending downwardly therefrom for insertion in the ground whereby the upper section is located above the top surface of the ground and the flange section forms a barrier between adjacent landscaping areas. Upwardly and outwardly diverging lips are formed integrally with the flange section intermediate the ends thereof for securing the flange section in the ground. The flange section is corrugated above the securing lips and is a plane section below the securing lips. The corrugations define vertical reinforcing ribs on the flange section, and the plane section below the securing ribs defines a lead-in portion to facilitate locating and inserting the divider structure in the ground. Preferably, the entire divider section is integrally extruded of plastic material.

26 Claims, 4 Drawing Figures

U.S. Patent     Aug. 4, 1981     4,281,473
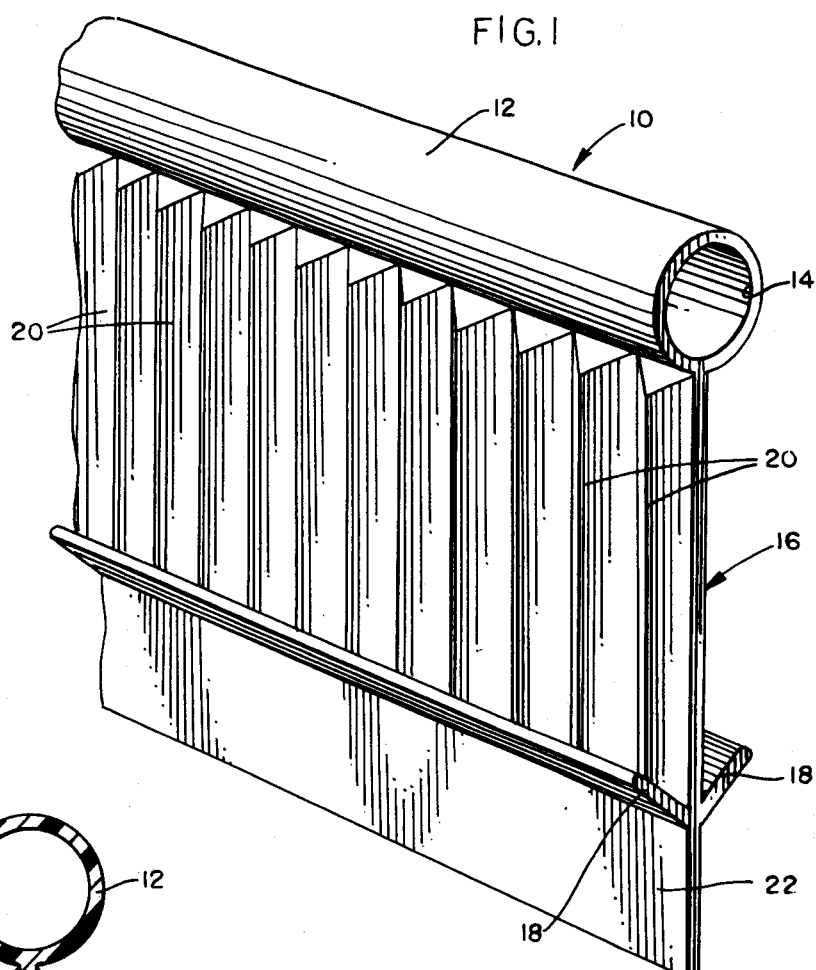
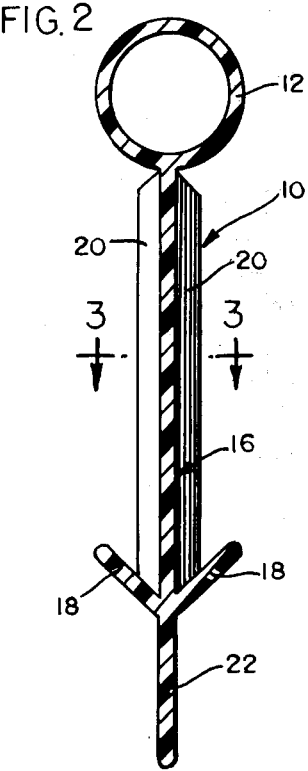
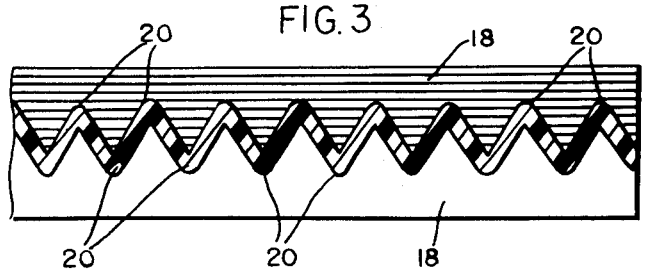
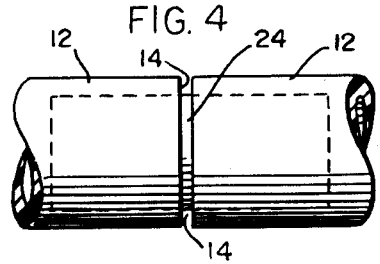

LANDSCAPING BED DIVIDER

BACKGROUND AND SUMMARY OF THE INVENTION

This invention relates to a landscaping bed divider.

It has long been the practice to separate various areas of a lawn, garden or other landscaping areas by means of gravel, rocks, bricks, or other suitable means arranged to form a boundry between the particular landscaping area and adjacent areas. Heretofore, the lawn is often separated from a flower bed or garden by a brick coping or curb, or the space adjacent the base of a tree is often separated from the lawn in the same general manner. As frequently happens, plant life such as grass or the like roots through or between the brick coping and into the area which is desired to be separated from the lawn. Many attempts have been made to provide a bed divider to prevent such grass rooting and spreading. The present invention is directed to providing a new and improved bed divider of the character described.

It is, therefore, a principal object of the present invention to provide a new and improved landscaping bed divider.

More particularly, an object of the present invention is to provide a new and improved landscaping bed divider, or the like, for forming a boundry between adjacent landscaping areas and for preventing plant life such as grass or the like from rooting between adjacent areas.

In the examplary embodiment of the present invention, the landscaping bed divider comprises an elongated divider structure which includes an enlarged upper section, and a flange section extending lengthwise along the upper section and depending downwardly therefrom for insertion in the ground, whereby the upper section is located above the top surface of the ground and the flange section forms a barrier between adjacent landscaping areas. Means is provided on the flange section for reinforcing the same in a vertical direction to facilitate inserting and maintaining the divider section in the ground. In addition, means is provided intermediate the top and bottom of the flange section to facilitate securing the flange section in the ground.

In the embodiment of the invention shown herein, the securing means comprises a pair of upwardly canted lips diverging outwardly and upwardly from the flange section. The reinforcing means is formed by corrugations in the flange section above the securing lips and defines vertical reinforcing ribs integral with and on the flange section above the lips. The flange section below the securing lips is a plane section defining a lead-in portion to facilitate locating and inserting the divider structure in the ground.

The divider structure of the present invention is an entirely integrally extruded structure preferably fabricated of plastic material. In the examplary embodiment of the invention, the enlarged upper section of the divider structure is tubular, and interconnecting means, such as plug members, are provided for insertion into the open ends of the tubular sections of adjacent divider structures for extending the structure about large landscaping areas.

Other objects, features and advantages of the invention will be apparent from the following detailed description taken in connection with the accompanying drawings.

DESCRIPTION OF THE DRAWINGS

FIG. 1 is a fragmented perspective view of a landscaping bed divider structure fabricated in accordance with the principles of the present invention;

FIG. 2 is a vertical sectional view through the divider structure of FIG. 1;

FIG. 3 is a horizontal sectional view of the divider structure, taken generally along the line 3—3 of FIG. 2; and FIG. 4 is a fragmented top plan view of the adjacent ends of a pair of adjacent divider structures, showing an interconnecting plug member inserted into the open ends of the tubular upper sections thereof.

DETAILED DESCRIPTION OF THE INVENTION

Referring to the drawings in greater detail, the landscaping bed divider of the present invention includes one or more elongated divider structures, generally designated 10. The divider structures are designed to be used in an individual length thereof, or by a plurality of interconnected divider structures, for forming a boundry between adjacent landscaping areas and for preventing plant life, such as grass or the like, from rooting between adjacent landscaping areas. At this point, it should be understood that the use of the terms upper and lower, or top and bottom, in the description and claims herein, are intended to refer to the normal orientation of the driver structure as shown in FIGS. 1 and 2, as the divider structure normally would be utilized for insertion in the ground.

Referring particularly to FIGS. 1 and 2, the divider structure 10 is elongated and includes an enlarged upper tubular section 12 having opposite open ends 14. A flange section, generally designated 16, extends lengthwise along the tubular upper section 12 and depends downwardly therefrom for insertion in the ground, whereby the upper section 12 is located above the top surface of the ground and the flange section 16 forms a barrier between adjacent landscaping areas.

Means is provided intermediate the top and bottom of the flange section 16 to facilitate securing the flange section in the ground. More particularly, in the embodiment of the invention shown herein, the securing means includes a pair of upwardly canted lips 18 which diverge outwardly and upwardly in an "arrow" fashion from the flange section 16. By this upwardly canted and diverging configuration, the divider structure is more easily inserted into the ground, but provides considerable resistance to the removal of the divider structure from the ground.

Means is provided on the flange section 16 for reinforcing the same in a vertical direction to facilitate inserting the divider structure in the ground and maintaining the same therein. More particularly, the reinforcing means is formed by corrugations defining vertical reinforcing ribs 20 on the flange section 16. It is contemplated that the flange section can be corrugated the entire width thereof so as to extend both above and below the securing lips 18.

However, in the preferred embodiment of the invention disclosed herein, the flange section 16 is corrugated above the securing lips 18 and is a plane section 22 below the securing lips 18. In this manner, the plane section 22 provides a unique lead-in portion to facilitate locating and inserting the divider structure in the ground, while the corrugated ribs 20 above the securing lips 18 provide a novel reinforcing means on the flange section not heretofore provided.

It should also be pointed out that two problems occur with prior divider structures after the structures have been inserted partially into the ground. These problems are caused by the increased insertion pressures required as the depth of insertion increases. First, the securing portion of prior divider structures tends to shift laterally as increased insertion pressure is required and as the depth of the securing means in the ground increases. The plane section 22 of the present invention below the securing lips 18 provides lateral resistance and guiding means below the securing lips 18 and prevents such lateral shifting. Secondly, as the depth of insertion of the divider structure increases, the insertion pressure increases, and prior structures tend to bend. The corrugation of the flange section 16, resulting in the reinforcing ribs 20 above the securing lips 18, prevents such bending.

As stated above, the divider structure 10 of the present invention may be used as a single bed divider, or a plurality of such divider structures may be employed in an end-to-end assembly. For such purposes, and referring to FIG. 4, interconnecting means is provided in the form of a plug member 24 which is inserted into the open ends of the tubular upper sections 12 of adjacent divider structures 10. Of course, many other such interconnecting means are contemplated by the present invention.

It is contemplated and has proven effective that the entire divider structure 10, including the enlarged upper section 12, the corrugated portion of the flange section 16, the securing lips 18, and the lower plane section 22 of the flange section, be extruded as an entirely integral structure, preferably fabricated of plastic material or the like. Of course, it is contemplated that the individual and combined inventive features of the present invention could be fabricated in other manners so as to arrive at the new and improved landscaping bed divider structure of the present invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

We claim:

1. A landscaping bed divider, or the like, for forming a boundry between adjacent landscaping areas and for preventing plant life such as grass or the like from rooting between adjacent areas, comprising: an elongated divider structure including an enlarged upper section, a flange section extending lengthwise along said upper section and depending downwardly therefrom for insertion in the ground whereby the upper section is located above the top surface of the ground and the flange section forms a barrier between adjacent landscaping areas, means on said flange section to facilitate securing the flange section in the ground and maintaining the same therein, and means on said flange section distinct from said securing means and between the securing means and said upper section for reinforcing the flange section in a vertical direction to facilitate inserting the divider structure in the ground.

2. The landscaping bed divider of claim 1, wherein said enlarged upper section is tubular.

3. The landscaping bed divider of claim 1, wherein said divider structure is an integrally extruded structure.

4. The landscaping bed divider of claim 3, wherein said divider structure is fabricated of plastic material.

5. The landscaping bed divider of claim 1, wherein said securing means is disposed intermediate the top and bottom of said flange section.

6. The landscaping bed divider of claim 5, wherein said securing means comprises at least one upwardly canted lip extending laterally outwardly from said flange section.

7. The landscaping bed divider of claim 6, wherein said securing means includes a pair of said upwardly canted lips diverging outwardly and upwardly from said flange section.

8. The landscaping bed divider of claim 1, including a plurality of said elongated divider structures, and means for interconnecting the structures in an end-to-end assembly.

9. The landscaping bed divider of claim 8, wherein said enlarged upper section is tubular, and said interconnecting means comprises a plug member inserted into the open ends of the tubular upper sections of adjacent divider structures.

10. The landscaping bed divider of claim 1, wherein said reinforcing means is formed integral with said flange section.

11. The landscaping bed divider of claim 10, wherein said integral reinforcing means is formed by corrugations defining vertical reinforcing ribs on the flange section.

12. The landscaping bed divider of claim 11, wherein said securing means is disposed intermediate the top and bottom of said flange section.

13. The landscaping bed divider of claim 12, wherein said flange section is corrugated above said securing means and is a plane section below said securing means, the plane section defining a lead-in portion to facilitate locating and inserting the divider structure in the ground.

14. The landscaping bed divider of claim 13, wherein said divider structure is an integrally extruded structure.

15. The landscaping bed divider of claim 14, wherein said divider structure is fabricated of plastic material.

16. The landscaping bed divider of claim 12, wherein said securing means comprises at least one upwardly canted lip extending laterally outwardly from said flange section.

17. The landscaping bed divider of claim 16, wherein said securing means includes a pair of said upwardly canted lips diverging outwardly and upwardly from said flange section.

18. A landscaping bed divider, or the like, for forming a boundry between adjacent landscaping areas and for preventing plant life such as grass or the like from rooting between adjacent areas, comprising:

an elongated divider structure including an enlarged upper section, a flange section extending lengthwise along said upper section and depending downwardly therefrom for insertion in the ground whereby the upper section is located above the surface of the ground and the flange section forms a barrier between adjacent landscaping areas, means intermediate the top and bottom of said flange section to facilitate securing the flange section in the ground, said flange section being corrugated above said securing means for defining vertical reinforcing ribs on the flange section, and the flange section below said securing means being a plane section defining a lead-in portion to facilitate locating and inserting the divider section in the ground.

19. The landscaping bed divider of claim 18, wherein said reinforcing means is located approximately ⅓ the distance upwardly from the lower edge of said flange section.

20. The landscaping bed divider of claim 18, wherein said entire divider structure is extruded.

21. The landscaping bed divider of claim 20, wherein said divider structure is fabricated of plastic material.

22. The landscaping bed divider of claim 18, wherein said securing means comprises at least one upwardly canted lip extending laterally outwardly from said flange section.

23. The landscaping bed divider of claim 22, wherein said securing means includes a pair of said upwardly canted lips diverging outwardly and upwardly from said flange section.

24. The landscaping bed divider of claim 18, including a plurality of said elongated divider structures, and means for interconnecting the structures in an end-to-end assembly.

25. The landscaping bed divider of claim 24, wherein said enlarged upper section is tubular, and said interconnecting means comprises a plug member inserted into the open ends of the tubular upper sections of adjacent divider structures.

26. The landscaping bed divider of claim 18, wherein said divider structure is entirely integral.

* * * * *